March 31, 1959 H. G. DOLL 2,879,942

TABULAR FUNCTION GENERATOR

Filed June 15, 1953

*INVENTOR.*
HENRI GEORGES DOLL

*BY* Robert Hockfield

HIS ATTORNEY

United States Patent Office 2,879,942

Patented Mar. 31, 1959

2,879,942

TABULAR FUNCTION GENERATOR

Henri Georges Doll, Ridgefield, Conn., assignor, by mesne assignments, to Schlumberger Well Surveying Corporation, Houston, Tex., a corporation of Texas Application June 15, 1953, Serial No. 361,617

6 Claims. (Cl. 235—197)

This invention relates to automatic computing apparatus and, more particularly, pertains to an improved computer for determining the value of a function of two independent variables.

Various computers have been proposed for this purpose, utilizing a screen inscribed with a family of curves representing the desired function. While these computers are generally satisfactory, the preparation of screens for a variety of functions may not be as easily and inexpensively accomplished as desired.

Therefore, it is an object of the present invention to provide an improved computer featuring a screen having indicia representing a desired function of two independent variables inscribed in a novel manner.

Another object of the present invention is to provide an improved computer including a member having indicia representing a desired function that may be easily, conveniently and inexpensively prepared.

Yet another object of the present invention is to provide an improved computer utilizing a code representation of a function of two independent variables for continuously following variations in the function as the variables vary to provide indications of the instantaneous value of the function.

Automatic computing apparatus constructed in accordance with the present invention may be employed for determining the instantaneous value of a desired function of two independent variables that may be of variable value. The apparatus comprises a member on which the function is coded or tabulated. The tabulation is searched to find the values of the independent variables corresponding to the instantaneous values of quantities, such as potentials, representing these variables. When such correspondence is obtained at a particular section of the member, the value of the function tabulated in that section is indicated.

More specifically, the tabulation of the member is in first, second and third tracks. A first of the independent variables is tabulated on the first track, the second of the independent variables is tabulated on the second track, and the function is tabulated on the third track.

In a specific embodiment of the invention, values of the second independent variable, as well as values of the function, are tabulated for each value of the first independent variable and the function. The first track is recurrently scanned to follow variations in the quantity representing the instantaneous value of the first independent variable. At the instant the proper value of the first independent variable is attained, scanning of the second and third tracks is initiated. At the instant the proper value of the second independent variable is attained, the value of the function tabulated in the third track is indicated.

In a modification of the apparatus, two tracks are utilized in place of the aforementioned third track. These two tracks conjointly define the function, for example, one defining successive positive values and the other successive negative values. Scanning of the two tracks is initiated at the instant the proper value of the first independent variable is attained and at the instant the proper value of the second independent variable is attained, an algebraic combination of the values tabulated in the two tracks is indicated.

According to another feature of the invention, there is provided a novel member for associating a function of first and second independent variables with automatic computing apparatus wherein the member is movable along a given path. The member includes first, second and third columns of indicia distributed parallel to the aforesaid path, and is comprised of consecutive sections. Each such section has an indicium in the first column representing one of consecutive values of the first variable, a group of indicia in the second column representing consecutive values of the second variable, and another group of indicia in the third column representing consecutive values of the function corresponding to the consecutive values of the second variable for the aforesaid one value of the first variable.

The novel features of the present invention are set forth with particularity in the appended claims. The present invention, both as to its organization and manner of operation, together with further objects and advantages thereof, may best be understood by reference to the following description taken in connection with the accompanying drawing in which:

Figures 1, 2, 3, 4:
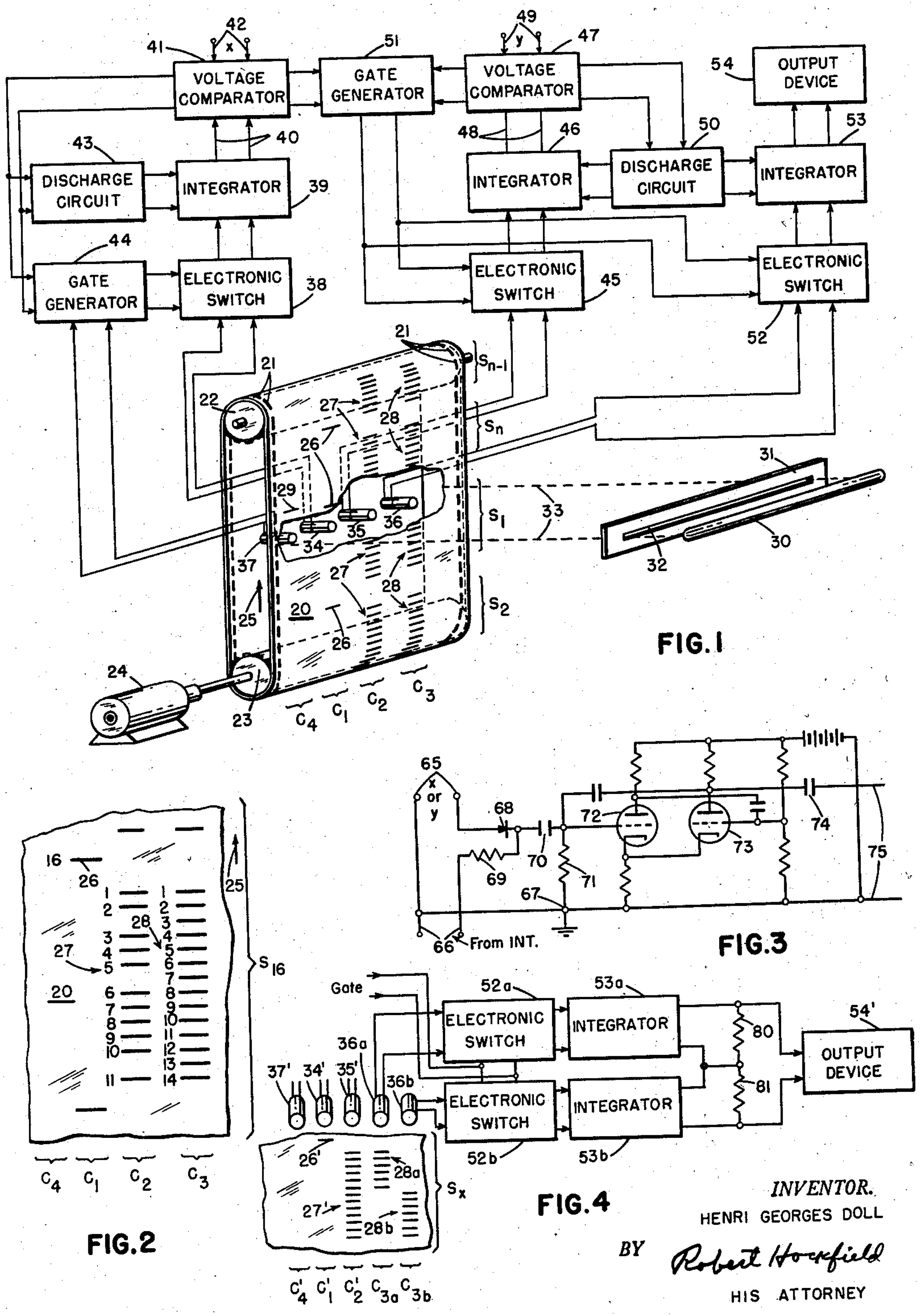
Fig. 1 is a schematic representation, partly in block form, of automatic computing apparatus embodying the present invention.
Fig. 2 is a plan view of a portion of the apparatus shown in Fig. 1 drawn to an enlarged scale.
Fig. 3 is a detailed circuit diagram of a portion of the computing apparatus of Fig. 1.
Fig. 4 represents a modification of the apparatus illustrated in Fig. 1.

In Fig. 1 of the drawing there is shown automatic computing apparatus constructed in accordance with the present invention and which may be employed to determine the value of a function of two independent variables that may be computed or of empirical origin. This apparatus comprises a member 20 in the form of an endless belt of a transparent material provided with sprocket holes 21 in meshing engagement with the teeth of a pair of spaced sprocket wheels or drums 22 and 23. Drum 23 is rotated by a driving motor 24, preferably at a constant speed, thereby displacing the belt 20 at a fixed velocity, along a given path lying in the plane of the front section of the belt, as viewed in Fig. 1, in a direction represented by an arrow 25.

Transparent belt 20 is provided with first, second and third tracks or columns $C_1$, $C_2$ and $C_3$ of indicia in the form of opaque dash-like markings distributed parallel to its path of movement. The belt is made up of sections $S_1$, $S_2$ . . . $S_{n-1}$ and $S_n$ occurring consecutively and in the named order relative to a point remote from the belt. Each of these sections has an indicium 26 in column $C_1$ representing one of consecutive values of the first independent variable, thereby effecting a tabulation in digit code of that variable. In addition, each section has a group 27 of indicia in column $C_2$ representing a tabulation in digit code form of consecutive values of the second independent variable and another group 28 of indicia in column $C_3$. The indicia in each of groups 28 represent consecutive values of the desired function tabulated in digit code form corresponding to consecutive values of the second independent variable occurring for a particular value of the first independent variable.

The organization of the columns and sections of belt 20 may be better appreciated by reference to Fig. 2 which illustrates the sixteenth section, $S_{16}$, of the belt drawn to an enlarged scale. Column $C_1$ includes a marking 26 representing the sixteenth consecutive value of a first independent variable which may be designated $x$. Assuming that the belt is displaced vertically in the direction of arrow 25, indicia 26 is followed, relative to a horizontal reference plane to be later defined, by a group 27 of the indicia in column $C_2$. These indicia represent consecutive values from 1 through 11 of a second independent variable which may be designated $y$. In column $C_3$ group 28 of indicia represents consecutive values from 1 through 14 of the function of the two independent variables, $f(x, y)$.

In order to maintain a constant accuracy with respect to the scale for the function values in column $C_3$, the indicia in groups 28 are spaced at equal distances from one another. This spacing, of course, dictates the general distribution of the indicia in groups 27. However, in order to facilitate fabrication of belt 20, the indicia in groups 27 are spaced from one another at multiples of a fixed distance, preferably equal to the spacing between the indicia in groups 28.

It is thus apparent that the indicia of belt 20 are distributed parallel to its path of movement and occur in consecutive sections defining the desired function for consecutive values of one of the variables, $x$. Each section is effectively provided with a tabulation of values of the function corresponding to consecutive values of the remaining variable, $y$. For example, if the value of variable $x$ is 16 and the value of variable $y$ is 7, it is evident from Fig. 2 that the function, $f(x, y)$ has an instantaneous value of 9.

Belt 20 also includes a synchronizing indicium 29 positioned in a portion of the belt designated column $C_4$ and intermediate sections $S_2$ and $S_n$. Consequently, mark 29 denotes a time-zero reference point for each complete traversal of the belt about its closed path.

In order to scan or search the tabulated values by counting the indicia in the several columns of belt 20, light energy is projected toward the belt by a source of light energy in the form of an elongated tubular bulb 30 in cooperation with a mask 31 having an elongated, horizontal slit 32. Thus, light energy is projected in a sheet bounded by horizontal dash lines 33 that define a horizontal reference plane transverse to the front portion of the belt. Since belt 20 is continuously displaced, its indicia modulate the light energy into corresponding pulsations. Four photoelectric cells 34, 35, 36 and 37 positioned behind the belt in alignment with respective ones of the columns $C_1$, $C_2$, $C_3$ and $C_4$ intercept and convert such light pulsations into corresponding electrical pulses.

Photocell 34 is coupled to the input circuit of an electronic switch 38 which may be of conventional construction featuring a circuit for selectively completing a signal translating path from its input circuit to its output circuit in response to each pulse that is applied to its control circuit. The output circuit of switch 38 is coupled to a pulse counter or integrator 39, in turn, connected by leads 40 to a voltage comparator 41 to which a voltage of an amplitude representing the instantaneous value of a variable quantity (independent variable $x$) is applied at terminals 42. Comparator 41 may be constructed in a manner to be described hereinafter and continuously compares the amplitudes of the voltages at leads 40 and terminals 42. Upon each occurrence of a predetermined relationship, such as equal amplitude values, a control signal or pulse is supplied to a discharge circuit 43 coupled to integrator 39 thereby resetting the integrator to a reference potential.

The control pulse is also applied to an input circuit of a gate generator 44 having another input circuit coupled to photocell 37. Generator 44 may be of conventional construction and produces a gate signal comprised of pulses, each of which is initiated by a pulse from photocell 37 and terminated by a pulse from comparator 41. This gate signal is applied to the control circuit of electronic switch 38.

Photocell 35 is coupled to a group of stages similar to the ones described in connection with photocell 34. These include an electronic switch 45, an integrator 46, a voltage comparator 47 having input leads 48 and input terminals 49, a discharge circuit 50 and a gate generator 51 providing another gate signal comprised of pulses, each of which is initiated by a pulse from comparator 41. A voltage having an amplitude dependent upon the value of another variable quantity (variable $y$) is applied to terminals 49 and upon each occurrence of equal amplitude values in the voltages at leads 48 and terminals 49, a control pulse is supplied to the discharge circuit 50 and to gate generator 51. Hence integrator 46 is reset at the same point in time at which the gate pulse from generator 51 is terminated.

Photocell 36 is coupled to the input circuit of another electronic switch 42, to the control circuit of which the gate signal from generator 51 is applied. Thus, switches 45 and 52 are operatively conditioned in unison. The output circuit of switch 52 is coupled to an integrator 53, in turn, coupled to an output device 54, such as a peak-reading recording voltmeter. In addition, discharge circuit 50 is connected to integrator 53.

In describing the operation of the automatic computing apparatus just described, it is assumed that motor 24 continuously drives belt 20 at a constant speed thereby displacing the belt along a path in the plane of its front section, as viewed in Fig. 1, in a direction parallel to arrow 25. It is further assumed that voltages having respective magnitudes representing the instantaneous values of the variable quantities (independent variables $x$ and $y$) are applied to terminals 42 and 49 respectively.

Moreover, an initial operating condition is assumed wherein electronic switches 38, 45 and 52 are disabled so that no pulses are translated to integrators 39, 46 and 53. Consequently, the integrator potentials are at reference amplitudes, which may be of zero value. Also, in the initial operating condition, belt 20 is at an instantaneous position just prior to the interruption of light energy in sheet 33 by synchronizing mark 29.

A cycle of operation is initiated with the interruption of light to photocell 37 by indicium 29 to produce an electrical pulse that actuates gate generator 44. The resulting gate pulse from generator 44 operatively conditions switch 38 and electrical pulses from photocell 34 representing interruptions of light energy by indicia 26 of column $C_1$ are supplied to and counted by integrator 39. The amplitude of the voltage at leads 40 thus increases in a manner defining the number of indicia 26 that interrupt light energy or movement of the belt subsequent to the zero-time reference position. Upon the occurrence of an amplitude substantially equal to the amplitude of the $x$-voltage at terminals 42, comparator 41 derives a control pulse which operates the discharge circuit 43, turns off gate generator 44 and turns on gate generator 51. For example, if the voltage at terminals 42 represents an instantaneous value of $x$ of 16 units, this control pulse occurs with the interruption of light energy by the indicium 26 of belt section $S_{16}$ (Fig. 2).

The gate pulse from generator 44 thus is terminated thereby disabling electronic switch 38, while at the same time the discharge circuit 43 resets the potential of integrator 39 to an initial reference or zero value.

In addition, since the control pulse from comparator 41 actuates generator 51, a gate pulse is initiated for operatively conditioning switches 45 and 52. As a result, counting is initiated in integrators 46 and 53 of indicia in a section of belt 20 determined by the value of variable $x$. The voltages developed by integrators 46 and 53 have amplitudes representing the number of indicia in columns $C_2$ and $C_3$, respectively, that interrupt light energy.

In the particular example under consideration, an instantaneous value of $x$ equal to 16 units is assumed. Let it further be assumed that the instantaneous value of $y$ is 7 units, which is represented by a potential at terminals 49 of a particular amplitude. Upon the occurrence of a voltage at leads 48 of essentially that amplitude, corresponding to the interruption of light energy to photocell 35 by 7 indicia of column $C_2$, a control pulse is derived by comparator 47. This control pulse terminates the gate pulse produced by gate generator 51 thereby disabling switches 45 and 52 and counting is halted in integrators 41 and 47. The control pulse also operates the discharge circuit 50 to restore integrator 46 to an initial zero reference potential.

From Fig. 2 it is apparent that during the interval of the gate pulse from generator 51, integrator 53 counts 9 interruptions in light energy by the indicia of column $C_3$ and a voltage having a magnitude representing 9 units is developed. Since peak-reading device 54 is responsive to this voltage, it records an instantaneous value of $f(x, y)$ equal to 9 units. Thereafter, with the operation of discharge circuit 50, integrator 53 is restored to a zero-reference level.

It is thus evident that the control potential from comparator 47, in association with gate generator 51 and electronic switch 52, is utilized to indicate the instantaneous value of the magnitude of the signal voltage developed by integrator 53. This value, of course, is determinative of the instantaneous value of the function and the required computations are recorded by indicator 54.

Subsequent to the portion of an operating cycle just considered, switches 38, 45 and 52 remain disabled and no further counting is effected. However, another cycle of operation is initiated with the interruption of light energy by synchronizing mark 29 at the time-zero-reference position of belt 20. Accordingly, a complete cycle of operation as described hereinbefore occurs for each complete traversal of the belt about its closed path.

Since belt 20 is displaced at a fixed velocity, the time integration of the pulses applied to integrator 53 during each operating cycle results in a peak voltage that is continuously representative of $f(x, y)$. Moreover, the speed of the belt is selected so that one cycle of the belt is completed before any substantial changes in the values of $x$ and $y$ occur. Therefore, continuous indications of the value of the function are recorded by device 54.

If desired, to speed the response of indicator 54, it may be discharged to a reference potential, such as zero, by discharge circuit 43 in response to a pulse from comparator 41. In this way, a peak indication of the voltage developed by integrator 53 is retained by peak-reading meter 54 from one cycle to the next. However, at the instant counting of the indicia in a particular section, $S_n$, of columns $C_2$ and $C_3$ is initiated, the peak-reading meter is discharged. Thus, it may build up to the new potential developed by integrator 53 at the termination of counting the indicia of section $S_n$ of column $C_3$.

From an inspection of Figs. 1 and 2, it is evident that belt 20 includes a simple tabulation of dash-line indicia which may be easily and conveniently inscribed. This novel representation of the function of two independent variables therefore permits a less expensive fabrication process than required to plot the function in the form of successive charts of curve lines.

Of course, the scale values for the independent variables or the function may be suitably chosen to provide any desired relationship such as a linear or a logarithmic one, as the case may be.

In Fig. 3 there is illustrated a circuit diagram of a voltage comparing device such as may be employed for comparators 41 and 47 of Fig. 1. It comprises a first pair of input leads 65 to which the voltage representing an independent variable is applied and a second pair of input leads 66 that connect to the output leads of a corresponding integrator. One of each pair of leads is grounded at 67 and the remaining leads are connected together via the series combination of a diode rectifier 68 and a load resistor 69. The junction of rectifier 68 and resistor 69 is connected to a condenser 70, in turn, connected to ground by a resistor 71. The capacitance value of condenser 70 and the resistance value of resistor 71 are chosen in a known manner so that these elements operate as a differentiating network.

The junction of condenser 70 and resistor 71 is connected to the control electrode of a triode-type electron tube 72 which together with another triode 73 is incorporated in a conventional single-shot multivibrator. The control electrode of triode 73 is maintained at a more positive potential relative to its cathode than the control electrode of triode 72 and hence the latter tube is normally conductive and the former is cut off. The various circuit parameters are adjusted so that a positive pulse at the control electrode of tube 72 causes a cycle of operation wherein a pulse of desired polarity, amplitude and duration is derived at the anode of tube 73 which is connected by coupling condenser 74 to one of a pair of output leads 75, the other of which is grounded.

The polarity of the voltage at leads 65 and the poling of diode 68 are such that the one voltage alone does not produce conduction in the diode 68, and tube 73 remains conductive. As the potential at leads 66 increases to a value substantially equal to that at leads 65, conduction in the diode occurs. Thus, a surge of current flows in load resistor 69 and differentiator 70, 71 produces from this surge a pulse that is applied to the control electrode of tube 72. As a result, multivibrator 72, 73 is actuated and it generates a single pulse that appears at leads 75. Thereafter, the circuit returns to its initially assumed operative condition.

Referring once again to Figs. 1 and 2, the belt there illustrated manifestly has a general background area exhibiting a given effect on incident light energy, namely, light is transmitted with essentially no attenuation. The opaque indicia have a different effect in that they attenuate light almost entirely. Such a belt may be fabricated by simple printing or photographic processes.

Alternatively, the belt may be opaque and the indicia transparent, and may be fabricated by a photographic or printing process. Of course, an opaque belt may be provided with punched openings to form the function. In any event, the general background area and the indicia have different effects on radiant energy.

It is also possible to employ a belt of magnetic material on which the indicia are inscribed in the desired columns and sections by magnetic marks in a well known manner. In this case, photoelectric means are not employed for developing electrical pulses. Instead, a magnetic pickup head is substituted for each of the photocells 34—37.

Obviously, the sections may be distributed consecutively along a circumferential path of a disc-shaped member that is continuously rotated. This may be employed in the light-modulating or magnetic types of apparatus.

Functions that may be accommodated by the computer of Fig. 1 exhibit values of the function which increase as the value of variable $y$ increases. To accommodate functions where the function value decreases as $y$ increases, as well as functions which exhibit increases, decreases, maxima or minima as $y$ increases, the apparatus may be modified in the manner shown in Fig. 4. Although, in this figure, but a portion of the apparatus is illustrated, the remaining portions may be obviously found in Fig. 1 and corresponding elements are represented by the same reference numerals followed by a prime designation.

A randomly selected section, $S_x$, of belt 20′ is illustrated and it is shown to comprise columns of indicia $C_{3a}$ and $C_{3b}$. Column $C_{3a}$ includes indicia that represent successively increasing values of the function for increasing values of variable $y$ while column $C_{3b}$ is provided with indicia that represent successively decreasing values of the function for increasing $y$ values. Thus, the groups of indicia 27a and 27b in each section conjointly define the values of the desired function.

Light interruptions by the indicia of columns $C_{3a}$ and $C_{3b}$ are converted to corresponding electrical pulses by photocells 36a and 36b. Pulses from photocell 36a are supplied via an electronic switch 52a to an integrator 53a and the pulses from photocell 36b are applied to an integrator 53b via an electronic switch 52b. The electronic switches 52a and 52b are under the control of gate generator 51 (Fig. 1).

Let it be assumed that the instantaneous value of $x$ is such that gate generator 51 operatively conditions electronic switches 52a and 52b in the $S_x$ section of the belt. Accordingly, the integrators 53a and 53b count interruptions in light by the indicia in groups 28a and 28b, respectively, and corresponding voltages are developed. The output circuits of integrators 53a and 53b are provided with load resistors 80 and 81 and are connected in series relation so that a voltage equal to the subtractive, algebraic combination of the integrator voltages is derived and applied to output device 54'. Thus, at any set of instantaneous values of variables $x$ and $y$, the correct instantaneous value of the function is applied to the output device.

Obviously, the modification of the invention represented in Fig. 4 may be employed to accommodate functions having values which are sometimes positive and sometimes negative.

Although a synchronizing mark in one column of the belt and photoelectric means have been illustrated for initiating each operating cycle in the automatic computers of Figs. 1 and 4, other arrangements may be suitably employed. For example, the mark may be interspersed with indicia 26 of column $C_1$. To this end, marks of different widths or heights may be utilized together with a suitable electronic pulse separator for supplying pulses representative of the $x$ indicia and a synchronizing pulse to the proper stages of the computer during each operating cycle. Alternatively, an electrically conductive mark may be inscribed on a belt of insulating material for completing an electrical circuit between a pair of brush type contacts.

While it is preferable to use a constant belt speed if time-integrators are utilized, obviously a reference column of indicia may be provided on the belt to effect speed compensation. Accordingly, the reference indicia control another integrator whose output voltage is supplied to integrators 39, 46 and 53 in such a way as to provide a desired compensation.

It is also possible to accommodate a function of three variables ($x$, $y$ and $z$). To that end, a first track or column of indicia is employed to select the proper value of variable $z$. Thereafter, a second track selects for the proper value of variable $x$ and a third track selects for the proper value of variable $y$, while integration is performed to obtain the instantaneous value of the function.

Moreover, although simple digit coding has been illustrated, other codes, such as a binary code, may be used. For example, if values of $x$ and $y$ are supplied in terms of voltage amplitudes, the value of the function may be derived in a binary code by providing the function values on a number of tracks corresponding to the number of digits required in the binary code. A trigger may be employed to operate precisely at the instant the $y$ variable reaches the proper value. Alternatively, the $x$ and $y$ values may be introduced in a binary coded form and the apparatus modified for this purpose, such as by the inclusion of suitable coincidence circuits.

While particular embodiments of the present invention have been shown and described, it is apparent that changes and modifications may be made without departing from this invention in its broader aspects, and therefore, the aim in the appended claims is to cover all such changes and modifications as fall within the true spirit and scope of this invention.

I claim:

1. Automatic computing apparatus for determining the value of a function of two independent variables comprising: a member movable along a given path and including first, second and third columns of indicia distributed parallel to said path and occurring in consecutive sections defining said function for consecutive values of one of said variables; means for continuously displacing said member along said path; means for deriving a first signal having an amplitude representing the number of indicia in said first column passing a predetermined point subsequent to a reference indicium; means for comparing the amplitudes of said first signal and an independent signal of variable amplitude to derive a control potential indicating the occurrence of substantially equal amplitudes of said first and said independent signals; means operatively conditioned by said control potential for simultaneously deriving second and third signals having respective amplitudes representing the number of indicia of said second and third columns passing predetermined points; means for comparing the amplitudes of said second signal and another independent signal of variable amplitude to derive another control potential indicating the occurrence of substantially equal amplitudes of said second and said other independent signals; and means for utilizing said other control potential to indicate the instantaneous value of the amplitude of said third signal.

2. Automatic computing apparatus for determining the value of a function of first and second independent variables comprising: a member movable along a given path and including first, second and third columns of indicia defining said function distributed parallel to said path, said member including consecutive sections, each such section having an indicium in said first column representing one of consecutive values of said first variable, a group of indicia in said second column representing consecutive values of said second variable, and another group of indicia in said third column representing consecutive values of said function for said one of said consecutive values of said first variable; means for continuously displacing said member along said path; means for counting the indicia in said first column passing a predetermined point subsequent to a reference indicium to derive a first signal having a characteristic representing the number of indicia counted; means for comparing said first signal with an independent signal having a similar characteristic representing a variable quantity to derive a control potential indicating the occurrence of an equality relationship between said characteristics of said first and said independent signals; means operatively conditioned by said control potential for counting the indicia of said second and third columns passing predetermined points to derive simultaneously respective second and third signals having characteristics representing the number of indicia counted; means for comparing said second signal with another independent signal having a similar characteristic representing another variable quantity to derive another control potential indicating the occurrence of an equality relationship between said characteristic of said second and said other independent signals; and means for utilizing said other control potential to indicate the instantaneous value of said characteristic of said third signal.

3. Automatic computing apparatus for determining the value of a function of two independent variables comprising: a member movable along a given path and including a general back ground area and first, second and third columns of indicia distributed parallel to said path and occurring in consecutive sections defining said function for consecutive values of one of said variables, said general background area and said indicia having different effects on light energy; means for projecting light energy toward said columns in a plane transverse to said path; means for continuously displacing said member along said path to effect modulation of light energy into pulsations by said indicia; photoelectric means for intercepting said pulsations of light energy and for deriving corresponding electrical pulses for each of said columns; means for counting the electrical pulses representing movement of said first column from a reference position to derive a first signal having an amplitude corresponding to the number of pulses counted; means for comparing said first signal with an independent signal of variable amplitude to derive a control potential indicating the occurrence of substantially equal amplitudes of said first and said independent signals; means operatively conditioned by said control potential for counting the electrical pulses representing movement of said second and third columns to derive simultaneously second and third signals having respective amplitudes corresponding to the number of pulses counted; means for comparing said second signal with another independent signal of variable amplitude to derive another control potential indicating the occurrence of substantially equal amplitudes of said second and said other independent signals; and means for utilizing said other control potential to indicate the instantaneous value of the amplitude of said third signal.

4. Automatic computing apparatus for determining the value of a function of two independent variables comprising: a member movable along a given closed path and including first, second and third columns of indicia distributed parallel to said path and occurring in consecutive sections defining said function for consecutive values of one of said variables; means for continuously displacing said member along said path; first counting means for deriving a first signal having an amplitude representing the number of indicia in said first column passing a predetermined point subsequent to a reference indicium; means for comparing the amplitudes of said first signal and an independent signal of variable amplitude to derive a control potential indicating the occurrence of substantially equal amplitudes of said first and said independent signals; second and third counting means operatively conditioned by said control potential for simultaneously deriving second and third signals having respective amplitudes representing the number of indicia of said second and third columns passing predetermined points; means for comparing the amplitudes of said second signal and another independent signal of variable amplitude to derive another control potential indicating the occurrence of substantially equal amplitudes of said second and said other independent signals; means for utilizing said other control potential to indicate the instantaneous value of the amplitude of said third signal; and means for resetting said first and said second counting means prior to each recurrence of said reference indicium at said first-mentioned predetermined point.

5. Automatic computing apparatus for determining the value of a function of first and second independent variables comprising: a member movable along a given path and including three columns of indicia distributed parallel to said path and occurring in consecutive sections defining said function for consecutive values of one of said variables, one of said columns including indicia representing said one variable and denoting said consecutive sections, another of said columns including a group of indicia in each of said sections representing values of said second variable and the remaining of said columns including respective groups of indicia in corresponding ones of said sections conjointly defining values of said function for particular values of said first variable; means for continuously displacing said member along said path; means for initiating counting of the indicia of said other and said remaining columns passing predetermined points in a section of said member determined by said indicia in said one column and a variable quantity to derive respective signals having a characteristic representing the number of indicia counted; means for comparing one of said signals representing said other column with a variable signal having a similar characteristic representing another variable quantity to derive a control potential indicating the occurrence of an equality relationship between said characteristics of said one and said variable signals; means for combining the remaining of said first-mentioned signals to derive a resultant signal having a characteristic representing an algebraic combination of the number of indicia counted in said remaining columns; and means for utilizing said control potential to indicate the instantaneous value of said characteristic of said resultant signal.

6. Automatic computing apparatus for determining the value of a function of first and second independent variables comprising: a member movable along a given path and including three columns of indicia distributed parallel to said path and occurring in consecutive sections defining said function for consecutive values of one of said variables, one of said columns including indicia representing said one variable and denoting said consecutive sections, another of said columns including a group of indicia in each of said sections representing values of said second variable and the remaining of said columns including two groups of indicia in each of said sections conjointly defining values of said function for particular values of said first variable; means for continuously displacing said member along said path; means for counting the indicia in said first column passing a predetermined point subsequent to a reference indicium to derive a first signal having an amplitude representing the number of indicia counted; means for comparing said first signal with an independent signal having an amplitude repersenting an independently variable quantity to derive a control potential indicating the occurrence of substantially equal amplitudes of said first and said independent signals; means operatively conditioned by said control potential for counting the indicia of said other and said remaining columns passing predetermined points to derive a second signal having an amplitude representing the number of indicia counted in said other column and third and fourth signals having amplitudes representing the number of indicia counted in respective groups of indicia of said remaining column; means for comparing said second signal with another independent signal having an amplitude representing another independently variable quantity to derive another control potential indicating the occurrence of substantially equal amplitudes of said second and said other independent signals; means for combining said third and said fourth signals and for obtaining indications of a resultant signal having a characteristic representing an algebraic combination of the number of indicia counted in said remaining columns; and means for utilizing said other control potential to terminate counting of indicia in said remaining column.

References Cited in the file of this patent

UNITED STATES PATENTS

| | | |
|---|---|---|
| 2,522,333 | Ackerlind et al. | Sept. 12, 1950 |
| 2,533,242 | Gridley | Dec. 12, 1950 |
| 2,549,071 | Dusek et al. | Apr. 17, 1951 |
| 2,587,532 | Schmidt | Feb. 26, 1952 |
| 2,597,866 | Gridley | May 27, 1952 |
| 2,610,791 | Avakian | Sept. 16, 1952 |

FOREIGN PATENTS

| | | |
|---|---|---|
| 521,871 | Great Britain | June 3, 1940 |